March 8, 1960   H. L. HANSON   2,927,999
MOTOR CONTROL CIRCUIT
Original Filed Nov. 28, 1951
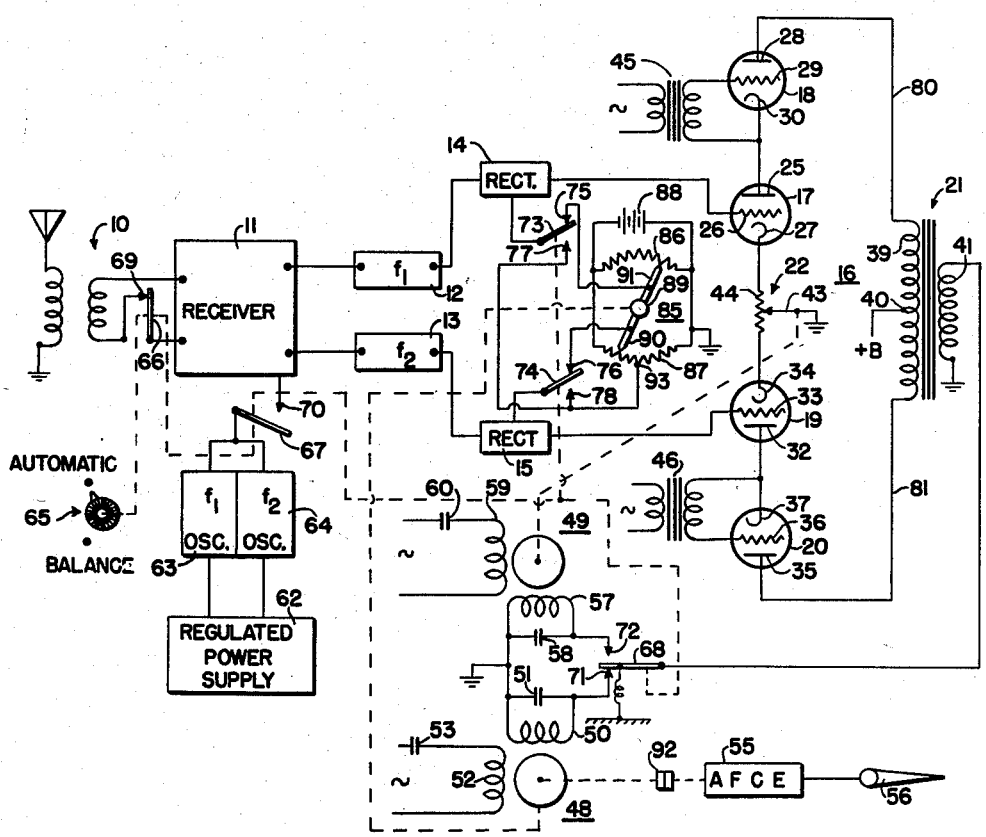
INVENTOR.
HENRY L. HANSON
BY
ATTORNEY

United States Patent Office 2,927,999
Patented Mar. 8, 1960

2,927,999
MOTOR CONTROL CIRCUIT

Henry L. Hanson, Willow Grove, Pa., assignor to Minneapolis-Honeywell Regulator Company, Minneapolis, Minn., a corporation of Delaware Original application November 28, 1951, Serial No. 258,630, now Patent No. 2,720,618, dated October 11, 1955. Divided and this application August 29, 1955, Serial No. 531,024

3 Claims. (Cl. 250—27)

This application is a division of my copending application Serial No. 258,630, filed November 28, 1951, now Patent No. 2,720,618, granted October 11, 1955.

The present invention is concerned with a new and improved signal modulating and motor control circuit. More particularly, the present invention is concerned with a motor control circuit wherein a control motor is arranged to be reversibly driven by a pair of modulated signal current flow control circuits where provision is made to maintain the current flow in the control circuits balanced when the input signal to the control apparatus is balanced.

In certain automatic control equipment, particularly in the field of blind landing equipment for aircraft, automatic control is obtained from signals transmitted from a central control station. In blind landing equipment, a desired line of travel of a controlled craft is defined by a pair of overlapping radio frequency beams, each of which is modulated at some desired low frequency, where the magnitudes of the modulated signals are equal. The control equipment in the craft is used to adjust the line of travel of the craft so that the modulated input signals from the beams are maintained equal as the craft comes in for a landing. The control signals are demodulated and the modulating frequency converted to a direct current. These direct current signals are generally reconverted into a modulated signal which has a frequency corresponding to the frequency of the craft's power supply so that a control motor may be readily controlled thereby. If there should be any unbalance of the circuits of the control equipment or the modulator, an actual balance, as far as the control beams are concerned, cannot be obtained and therefore the craft may be several feet off the desired course which may be disastrous.

It is therefore an object of the present invention to provide a new and improved apparatus for balancing the control circuits for a controlled motor.

Another object of the present invention is to provide a new and improved control signal modulator circuit.

Still another object of the present invention is to provide a pair of control circuits for a controlled motor with means for balancing the output electrical characteristics of the control circuits when the input signal to these circuits is balanced.

A further object of the present invention is to provide a new and improved signal combining circuit when it is possible to utilize a direct current control signal in controlling an alternating current motor.

These and other objects of the present invention will be understood upon considering the following specification and drawings of which the figure shows schematically an arrangement of the present invention where manually actuated means are provided for obtaining a circuit balance.

Referring now to the figure, the numeral 10 represents an antenna assembly for a blind landing control apparatus which may be carried by an aircraft. This antenna assembly picks up the radiated signals from a suitable ground station and feeds them to a receiver 11. The receiver 11 is used to demodulate the input control signals and reduce the received signals to a pair of control signals $f_1$ and $f_2$. These control signals are fed through a pair of filter networks 12 and 13 and then to a pair of rectifiers 14 and 15. These rectifiers 14 and 15 have a direct current output voltage which is used to bias a suitable motor control network 16.

The motor control network 16 comprises a plurality of electron discharge devices 17, 18, 19, 20, an output transformer 21, and a control potentiometer 22.

The electron discharge device 17 comprises an anode 25, a control electrode 26, and a cathode 27 which may be heated to be electron emissive by any suitable means not shown. The electron discharge device 18 comprises an anode 28, a control electrode 29, and a cathode 30 which also may be heated to be electron emissive by any suitable means not shown. The electron discharge device 19 comprises an anode 32, a control electrode 33, and a cathode 34 while the electron discharge device 20 comprises an anode 35, a control electrode 36, and a cathode 37. The cathodes 34 and 37 may also be heated by any suitable means, not shown, so that the same are electron emissive.

The transformer 21 comprises a tapped input or primary winding 39 having a center tap at 40 and an output or secondary winding 41.

The control potentiometer 22 comprises a slider 43 and a slide-wire resistor 44. Connected between the control electrodes and cathodes of the discharge devices 18 and 20 are biasing transformers 45 and 46 having their primaries preferably connected to the aircraft's alternating current source of power.

The output winding 41 of the transformer 21 is arranged for connection to the control windings of one or the other of a pair of motors 48 and 49. The motor 48 comprises an input winding 50 with a suitable condenser 51 connected there across and a line winding 52 having in series therewith a suitable phase shifting condenser 53. This line phase winding is connected to the same source of power as the primaries of the biasing transformers 45 and 46. Motor 48 is arranged for connection to suitable automatic flight control equipment 55 which may be used to adjust an aircraft control surface 56. A Mosely Patent 2,423,337 shows one way in which a system of the present type may be used with a flight control system. The motor 49 comprises a control winding 57 which has connected in parallel therewith a suitable condenser 58. The motor also has a line phase winding 59 with a phase shifting capacitor 60 in series therewith. This line phase winding is also connected to a common source of power with the primaries of biasing transformers 45 and 46. The motor 49 is arranged for connection to the slider 43 of the control potentiometer 22.

Also included in the apparatus is a regulated power supply 62 which supplies voltages to a pair of oscillators 63 and 64 which produce frequencies corresponding to frequencies $f_1$ and $f_2$. The magnitudes of the control signals from these two oscillators are equal. A manually operated switch 65 is arranged to actuate a plurality of switch blades 66, 67, 68, 73 and 74. The switch blade 66 is normally in engagement with an associated contact 69 while the blade 67 is normally out of engagement with a contact 70. The blade 68 is normally biased into engagement with a contact 71 and is arranged for movement into engagement with a contact 72 when the manually operated control 65 is moved from the automatic to the balance position. Blades 73 and 74 are normally in engagement with contacts 75 and 76 respectively. When the control 65 is moved to the balance position, the blade 73 will engage contact 77 and blade 74 will engage contact 78.

A system balancing network is indicated at 85 and comprises a pair of potentiometer slide wires 86 and 87 whose ends are connected to a battery 88. A follow-up member 89, which is positioned by motor 48, insulatingly carries a pair of sliders 90 and 91 which cooperate with the respective potentiometer slide wires 87 and 86. The slide wire 87 is tapped at 93.

*Operation*

In considering the operation of the figure, let it first be assumed that the apparatus is in the position shown upon the drawing with the manual control 65 being positioned in the automatic position. When in this position, the switch blade 66 will be engaging contact 69 and the switch blade 68 will be engaging contact 71. With the controlled aircraft in flight and coming in on the radio control beams, the antenna 10 will be detecting the signals radiated from the ground station. These signals will be fed into the receiver 11 where they will be demodulated and reduced to a pair of control signals $f_1$ and $f_2$ and fed through the filters 12 and 13 to the rectifiers 14 and 15. The direct current produced on the outputs of the rectifiers 14 and 15 is added to the rebalancing signals from network 85 and the resultant signals are used to control the control electrode potentials of the electron discharge devices 17 and 19 respectively. The current flow for the electron discharge device 17 may be traced from the +B terminal connected to tap 40 of input winding 39 of transformer 21 through the upper half of the input winding 39, conductor 80, anode 28, cathode 30, anode 25, cathode 27, the upper half of slide-wire resistor 44, and slider 43 to ground. It will be noted that the current flow for the electron discharge device 17 is traced through the discharge device 18. Since the device 18 has an alternating current signal connected between the grid and cathode thereof, the device 18 will act as a variable resistance whose resistance will be varying at a rate dependent upon the frequency of the alternating current on the primary of the biasing transformer 45, ordinarily, in aircraft, 400 cycles. With a direct current biasing signal from rectifier 14 and follow-up network 85 on slider 91 applied to control electrode 26, it will be seen that the current flow in this series circuit which includes the discharge devices 17 and 18 will be dependent upon the magnitude of this biasing voltage and also upon the alternating bias applied to the discharge device 18. Thus, the direct current signal on 17 is varied at a 400 cycle rate so that in effect the control signal on electrode 26 is combined or added to the 400 cycle signal originating in the discharge device 18.

The current flow circuit for the discharge device 19 may be traced from the +B terminal connected to tap 40 of winding 39 through the lower half of the winding 39, conductor 81, anode 35, cathode 37, anode 32, cathode 34, the lower half of slide-wire resistor 44, and slider 43 to ground. As the discharge device 20 has an alternating current bias supplied thereto, it will act as a variable resistance which will be varying at a rate dependent upon the input control signal which will be the same as that of discharge device 18. Further, the bias signal originating from the rectifier 15 and follow-up network on slider 90 will be regulating the current flow through the discharge device 19 so that the net current flow through the circuit which includes the discharge devices 19 and 20 will be the resultant of the combined biasing signals on the discharge devices 19 and 20.

It will be noted that the current flows through the discharge devices 17 and 18 and that through devices 19 and 20 are in opposite directions through the winding 39. Since they are in opposite directions and occur at the same time they tend to oppose each other and if the current flows are of equal magnitude in each of the two circuits then there will be no resultant flux applied to the output winding 41. With no output in the winding 41 there will be no current flow through the control winding 50 of the motor 48 so that this motor will remain in a fixed position.

If the aircraft should deviate from the desired line of flight so that the control frequencies $f_1$ and $f_2$ appear with different magnitudes, the biasing effects from the rectifiers 14 and 15 will be different so that the current flows in the control circuit including devices 17 and 18 and 19 and 20 will be different. This difference in current flow through the devices 17 and 18 when compared with that of 19 and 20 will cause the circuit having the greater current flow to produce more flux in the input winding 39 so that it will be predominant and produce an output signal in the output winding 41. This output signal will be fed to the control winding 50 of motor 48 and phased so that the motor will rotate and through a clutch adjust the automatic flight control equipment 55 and thus make appropriate corrections upon the control surface 56 to cause the aircraft to move back to its proper position on the landing beam. As the motor 48 adjusts the automatic flight control equipment 55, it also adjusts the follow-up member 89 and the sliders 90 and 91 so that there will be a system balance and the motor 48 will not operate beyond the condition of unbalance due to divergence from the landing beam. Depending upon the direction of operation of motor 48, the sliders 90 and 91 will be adjusted to counteract the voltage unbalance on the outputs of the rectifiers 14 and 15 so that the net input to each of the devices 17 and 19 will be the same. It will be noted that when the sliders 90 and 91 are centered on their respective slide wires the voltage on each slider will be the same. As the member 89 is rotated, the voltage on one slider will decrease and the other will increase with respect to ground. As soon as the control surface 56 has moved the controlled craft back to its appropriate position on the landing beam, the input signals $f_1$ and $f_2$ will become balanced or of equal magnitude so that the motor 48 will operate to restore balance on the inputs to the motor control circuit 16 by repositioning the follow-up member 89 until there will be no further rotation of the control motor 48. The movement of motor 48 will also cause readjustment of the automatic flight control to bring the craft to steady flight on the beam.

Inasmuch as the apparatus depends for its operation upon there being a current balance in the control circuit 16 when the magnitudes of the two control signals $f_1$ and $f_2$ are equal, it is essential that the circuit constants of the electron discharge devices 17 and 18 and 19 and 20 be selected to be as near matched as possible. As the matching of these discharge devices is difficult and due to the fact that discharge devices age so that their characteristics drift after they have been in use for a period of time, it is essential that provision be made for balancing these characteristic differences which may result in causing control motor operation when such operation is not desired.

In the figure, the balancing of the currents in the motor control circuit 16 is accomplished manually by the adjustment of the controller 65 from the automatic position over to the balance position. When moved to this position, the switch blade 66 will move out of engagement with contact 69 and the blade 67 will engage contact 70. The blade 68 will move out of engagement with contact 71 and will move into engagement with contact 72. Blades 73 and 74 are moved from engagement with contacts 75 and 76 to engage with contacts 77 and 78. With the controller 65 in this position, the radio signals from the antenna 10 will be cut out and the standard signals arising from the oscillators 63 and 64 will now be fed into the receiver where the same will be passed through the filters 12 and 13 to the rectifiers 14 and 15. The rectifiers 14 and 15 will produce a direct current biasing voltage for each of the discharge devices 17 and 19 respectively as was the case when the signals $f_1$ and $f_2$ originated from the antenna 10. This biasing voltage will be added to the biasing voltage from the tap 93 in the follow-up network 85. This tap is selected at the midpoint of the slide wire 87 because that is the value of biasing voltage which normally is added to the input biasing circuit when the whole system is balanced and the sliders 90 and 91 are centered. In other words, the rebalancing operation takes place with a biasing voltage on the input to devices 17 and 19 which is in their normal operating range.

If the resultant current flows through the upper and lower halves of the input winding 39 are balanced, there will be no output signal in the output winding 41 and therefore the motor 49 will remain stationary. However, if the current flows are unbalanced due to the shifting of the electrical characteristics in either of the control circuits, the resultant current flow through the winding 39 will produce an output at the output winding 41 and a control signal will be fed through the switch blade 68, switch contact 72, to the control winding 57 of motor 49 so that this motor 49 will rotate. The rotation of the motor 49 will be such as to position the slider 43 in a direction to change the self bias in the two control circuits including devices 17 and 19 so that the current flows will be balanced and the motor 49 will remain stationary.

As soon as the balancing operation is completed, the apparatus may be switched back to the automatic position so that it is possible to control the motor 48 in accordance with the signals picked up by the antenna 10. It will be thus assured that the movement or position of the motor 48 will be dependent upon the magnitudes of the control signals $f_1$ and $f_2$ originating from the antenna 10 and not due to any unbalance which may exist in the motor control circuit 16.

From the foregoing it will be noted that there has been provided in the present control apparatus a device for maintaining an electrical balance in the motor control circuit. Further there has been provided a new and improved signal combining circuit or discriminator wherein it is possible to utilize a direct current control signal in the controlling of an alternating current motor. While many modifications will be of use to those skilled in the art, it is intended that scope of the invention be limited solely by the appended claims in which I claim:

1. Discriminator means comprising: first, second, third and fourth electronic amplifying devices, each of said devices having a plurality of electrodes including a pair of output electrodes through which current may flow, and a control electrode energizable to control the current flowing in said output electrodes; a source of electrical power; load means; means connecting in series the output electrodes of said first and second amplifying devices; means connecting in series the output electrodes of said third and fourth amplifying devices; means including said load means connecting said source of power to said amplifying devices; a first direct current control signal connected to the control electrodes of said first device; a second direct current control signal connected to the control electrodes of said third device; and alternating current reference potential means connected in like phase relation to the control electrodes of said second and fourth amplifying devices.

2. Discriminator apparatus comprising: a pair of current controlling channels, each of said channels comprising load means and first and second electronic amplifying devices, each device having control and output electrodes, the output electrodes of said first and second devices being connected in series and in series with said load means; a source of electrical power; means connecting a first direct current control signal to the control electrodes of the first electronic amplifying device of the first of said channels; means connecting a second direct current control signal to the control electrodes of the first amplifying device of the second of said channels; and means connecting an alternating current reference potential to the control electrodes of the second amplifying device in like phase relation in both of said channels so that said second amplifying devices are thereby simultaneously rendered conductive for one half cycle and nonconductive for the succeeding half cycle of the alternating reference potential; and circuit means connecting said current controlling channels in parallel to said source of power.

3. An electronic circuit comprising: first, second, third, and fourth electronic amplifying devices, each of said devices having control and output electrodes; means connecting the output electrodes of said first and second devices to operate in series; means connecting the output electrodes of said third and fourth devices to operate in series; differential load means having first and second portions; a source of electrical power; means connecting a first source of direct current signal of variable magnitude to said first device control terminals; means connecting a second direct current signal of variable magnitude to said third device control terminals; means connecting an alternating current reference potential to said second and fourth devices control terminals in a phase relation to simultaneously render said second and fourth devices conductive for one half cycle of said alternating reference potential and nonconductive for the succeeding half cycle; and circuit means including the first and second portions of said load means connecting, respectively, said third and fourth devices in parallel with said first and second devices and to said source of power so that during said one half cycle current flows through said devices and said first and second portions of said load means with the magnitudes of said current being a function of said first and second signals, respectively.

References Cited in the file of this patent

UNITED STATES PATENTS

| | | |
|---|---|---|
| 2,176,742 | La Pierre | Oct. 17, 1939 |
| 2,278,212 | Moyer | Mar. 31, 1942 |
| 2,446,607 | Peterson | Aug. 10, 1948 |
| 2,530,387 | Goertz | Nov. 21, 1950 |
| 2,576,137 | Newitt | Nov. 27, 1951 |
| 2,582,596 | MacRae | Jan. 15, 1952 |
| 2,586,151 | Costello | Feb. 19, 1952 |
| 2,594,535 | Bertram | Apr. 29, 1952 |
| 2,619,594 | Goldberg | Nov. 25, 1952 |
| 2,693,534 | Bertram | Nov. 2, 1954 |
| 2,788,450 | Suntein et al. | Apr. 9, 1957 |